United States Patent

Martinez

[11] Patent Number: 6,121,781
[45] Date of Patent: Sep. 19, 2000

[54] COMPONENT SUPPORT AND MECHANIZATION MACHINE

[76] Inventor: Manuel Torres Martinez, Sancho el Fuerte, 21, 31007 Pamplona, Spain

[21] Appl. No.: 08/943,311

[22] Filed: Oct. 14, 1997

[30] Foreign Application Priority Data

Oct. 15, 1996 [ES] Spain ............................ 9602171

[51] Int. Cl.[7] ................ G01R 27/26; B43L 5/00; B23C 1/12
[52] U.S. Cl. ............... 324/658; 324/661; 324/679; 33/1 M; 409/205
[58] Field of Search ................ 324/658, 661, 324/686, 679; 73/1.75, 1.79; 33/700, 710, 1 M, 1 LE, 1 SB, 1 SA, 1 SC; 409/205

[56] References Cited

U.S. PATENT DOCUMENTS

| | | | |
|---|---|---|---|
| 4,397,598 | 8/1983 | Ess et al. ............... | 414/28 |
| 4,604,021 | 8/1986 | Werner ............... | 414/226 |
| 4,711,016 | 12/1987 | Genschow et al. ............... | 29/568 |
| 5,163,793 | 11/1992 | Martinez ............... | 409/205 |

FOREIGN PATENT DOCUMENTS

91 31 0711  2/1995  European Pat. Off. .

*Primary Examiner*—Josie Ballato
*Assistant Examiner*—Jermele M. Hollington
*Attorney, Agent, or Firm*—Nath & Associates; Gary M. Nath; Harold L. Novick

[57] ABSTRACT

A component support and mechanization machine, which is comprised of a set of units U.1 to U.n, each of which comprises a collection of arcs that form continuous arc-shaped trajectories along which may be moved a series of telescoping columns, equipped with workheads with double hinge joints and capacitative sensors. The arcs of each unit are mounted on rails and the different units U.1 to U.n are placed on main rails.

6 Claims, 10 Drawing Sheets

COMPONENT SUPPORT AND MECHANIZATION MACHINE

BACKGROUND OF THE INVENTION

1. Field of the Invention

In such sectors as the aeronautics industry it is often necessary to construct processes for mechanizing or riveting components that in many cases have very large surface areas and come in a variety of shapes, which considerably complicates the handling and firm securing of such components during the working phase, thus requiring the use of rigid attachments for each component, and thereby entailing a sizeable investment in such attachments.

2. Description of the Prior Art

A prior art solution to the problem of supporting curved or spherical components to be mechanized or riveted is to use support columns whose free ends are equipped with double hinge joints and air valves, so that the points of support for the components to be mechanized or riveted are determined by selectively positioning the free ends in terms of height and in an "X" and "Y" direction on the columns, thereby operating like a multi-flexible machine or tool which changes its shape according to the component program and by means of a computer that controls the drive motors. This is the case of Applicant's Spanish Patent No. P-9100894 and Spanish Utility Model No. U-9101588.

In all known prior art solutions the columnar supports are arranged on straight guides that restrict the angle of curvature.

The aeronautics industry requires flexible machines and tools that have a greater angle of curvature of up to 180° or more, particularly in regard to the most recent generation of riveters that are able to join several fuselage panels forming a 180° arc. To do so it is necessary for the support columns to move, not on straight guides, but on guides that are circular in shape, such that the points of support can be positioned anywhere over the arced surface without any restrictions or dead zones.

SUMMARY OF THE INVENTION

According to a preferred embodiment of the present invention, the machine incorporates arcs whose ends are supported on parallel rails thereby allowing for linear motion along the line of the rails by means of precision guides and skids. The arcs are driven by a motor located at each end of the arcs and engage toothed racks attached to each rail.

On one side of the arcs are two circular guides and one curved toothed rack. The guides permit movement of the column support. A motor attached to the column support drives the rack, thereby permitting movement of the column along the length of the arc.

Each column has its own motor to drive its lengthwise movement, all of which is controlled by a computer program, which provides automatic positioning of the various columns so that the supporting end of each column can be placed anywhere in space within preset limits. This permits positioning of any type of component within the preset limits.

Another important factor which is fundamental to enabling precise measurement and to ensure correct positioning of the columns and of their free supporting ends is the way the rigid securing of each column has been resolved, so that regardless of the positioning in terms of height that can be adopted in each case, there is always great rigidity.

Using a variety of arcs, each of which has its own positioning columns and all of which are connected at their ends to two rails, a flexible unit is thereby formed, and the set of several flexible units constitutes -he machine that is the object of the present invention.

All of this combines to create a machine that is completely automatic, quick, and very precise in positioning. Its support columns, permit movement along three axes in order that the upper free end of each column can be located in space precisely where it needs to be so as to support the working component, as a function of the shape of such component and the position it must occupy in space.

Accordingly, the present invention comprises a machine with a support system that is multi-flexible because it is adaptable for any type of component and to any position it must occupy; it is automatic, since the computer program establishes the necessary movements in each case and the exact position the supporting ends of the column must occupy; and it is, therefore, quick and very safe.

One practical application of this machine is the very precise positioning of several panels that form an arc of up to 180° by employing several flexible units mounted on fixed rails off the floor which permits them to pass through the interior of a circular riveter, which is already available on the market, thereby permitting a number of operations to be performed simultaneously. These operations include: loading and positioning of panels; riveting of stringers; loading and positioning of frames; riveting of clips and frames; unloading of riveted panels; and transporting of each flexible unit into load position.

The foregoing and other features and advantages of the present invention will be apparent from the following more particular description of a preferred embodiment of the invention as illustrated in the accompanying drawings.

DETAILED DESCRIPTION OF A PREFERRED EMBODIMENT

The purpose of the present invention is a machine with flexible tools for positioning panels for the performance of a variety of operations in the aeronautics industry and in particular for automatically riveting the fuselage.

Figures 8, 8A:
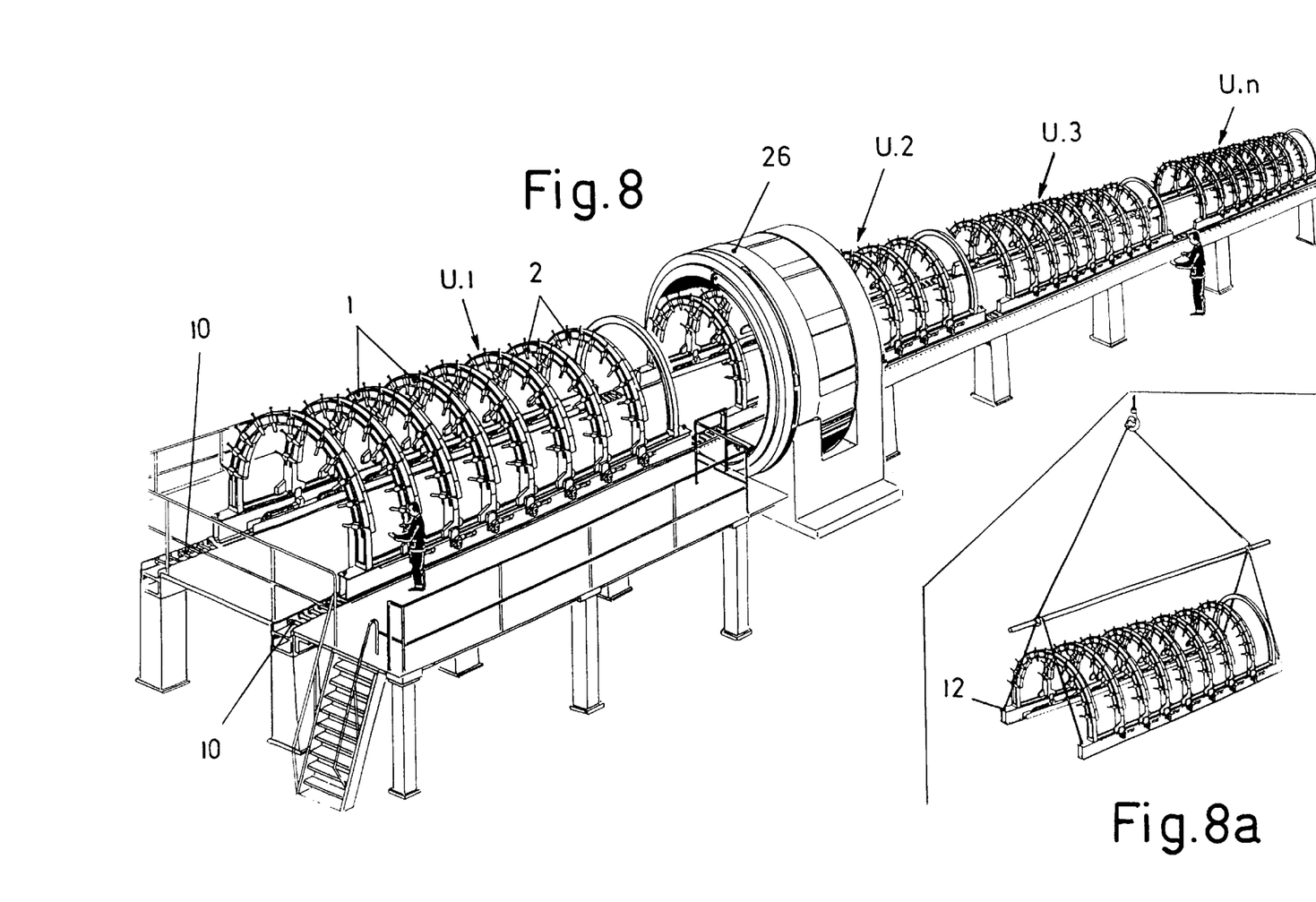
FIG. 8 is a view in perspective of several flexible units U.1 to U.n placed for the positioning of fuselage panels to be riveted by a circular riveter 26.
FIG. 8a is a detail in perspective showing the transporting of the flexible unit.
Figure 9:
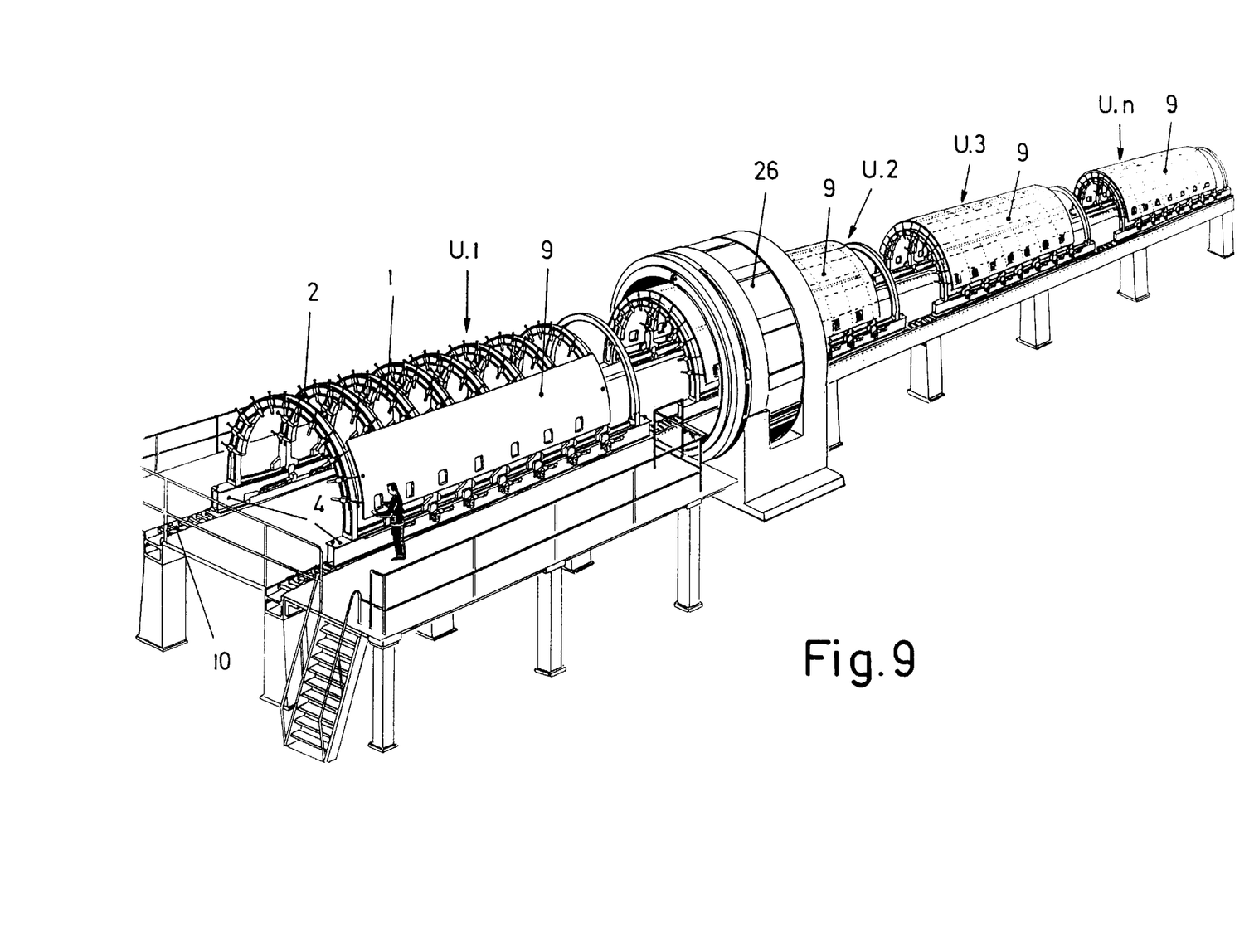
FIG. 9 is the same perspective view as in FIG. 8, except that it shows the flexible system with panels 9 already in place on arcs 1 in position for riveting.

The machine comprises a set of several flexible units U.1 to U.n, as illustrated schematically in FIGS. 8 and 9.

Figure 1:
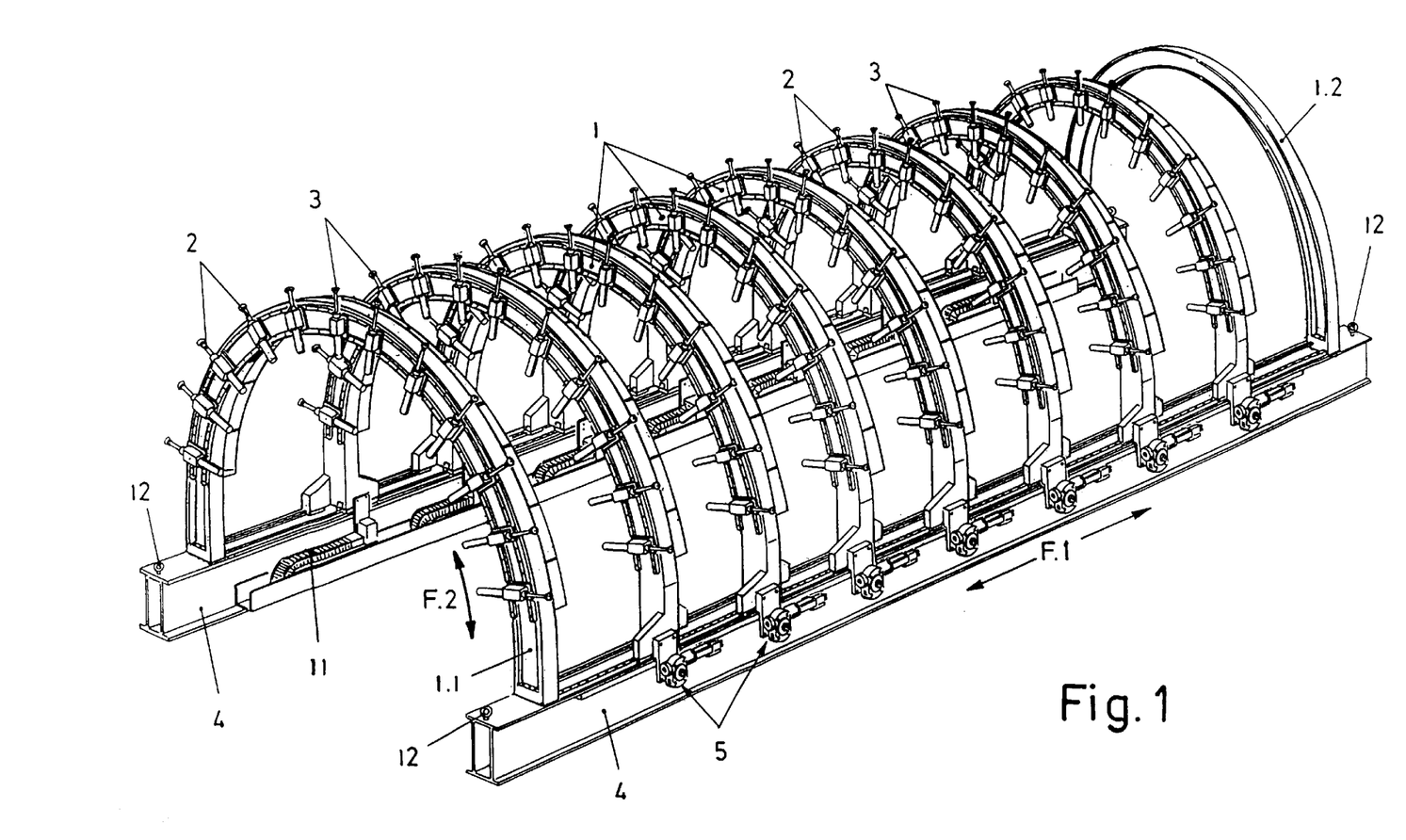
FIG. 1 is a perspective and schematic view of a preferred embodiment of a flexible unit of the present invention.

As shown in FIG. 1, each of flexible units U.1 to U.n comprises a series of arcs 1 mounted on two rails 4, in such a way that each arc 1 includes a set of telescoping support columns 2 on a free end of each of which sits a workhead 3. In each flexible unit there are at least two end arcs 1.1 and 1.2 that are also connected to rails 4. Of these two connected arcs, arc 1.2 does not have telescoping support columns 2, as shown in FIG. 1.

Each arc 1 is capable of being moved in the direction indicated by the arrow F.1 in FIG. 1 by engaging gearmotors 5; meanwhile the various flexible units U.1 to U.n can be moved along the length of rails 10, as shown in FIG. 8. Flexible cable chains 11 for the arcs 1, are illustrated in FIG. 1.

Telescoping support columns 2 of each arc 1 can be moved along the entire length of the arc 1, following a curved trajectory indicated by arrow F.2 in FIG. 1; accordingly, telescoping support columns 2 can thus be moved along both axes "X" and "Y": "X" in a horizontal direction with respect to the system, and "Y" in a direction that is angled and perpendicular to the "X" axis.

In addition to these movements, each telescoping support column 2 can move its workhead 3 in the direction of the longitudinal axis of the telescoping support column 2; which is to say in a "Z" direction and always along the trajectory of the point of curve of arc 1.

In this way, workhead 3 on each telescoping support column 2 can be moved in space along the three axes "X", "Y", and "Z" of the Cartesian coordinate system, until it occupies the precise point where it is to secure the corresponding panel 9 to be riveted, within preset logical limits as represented schematically in FIG. 9. The machine is designed to support panels 9 in a riveting process using a circular riveter 26.

Figure 2:
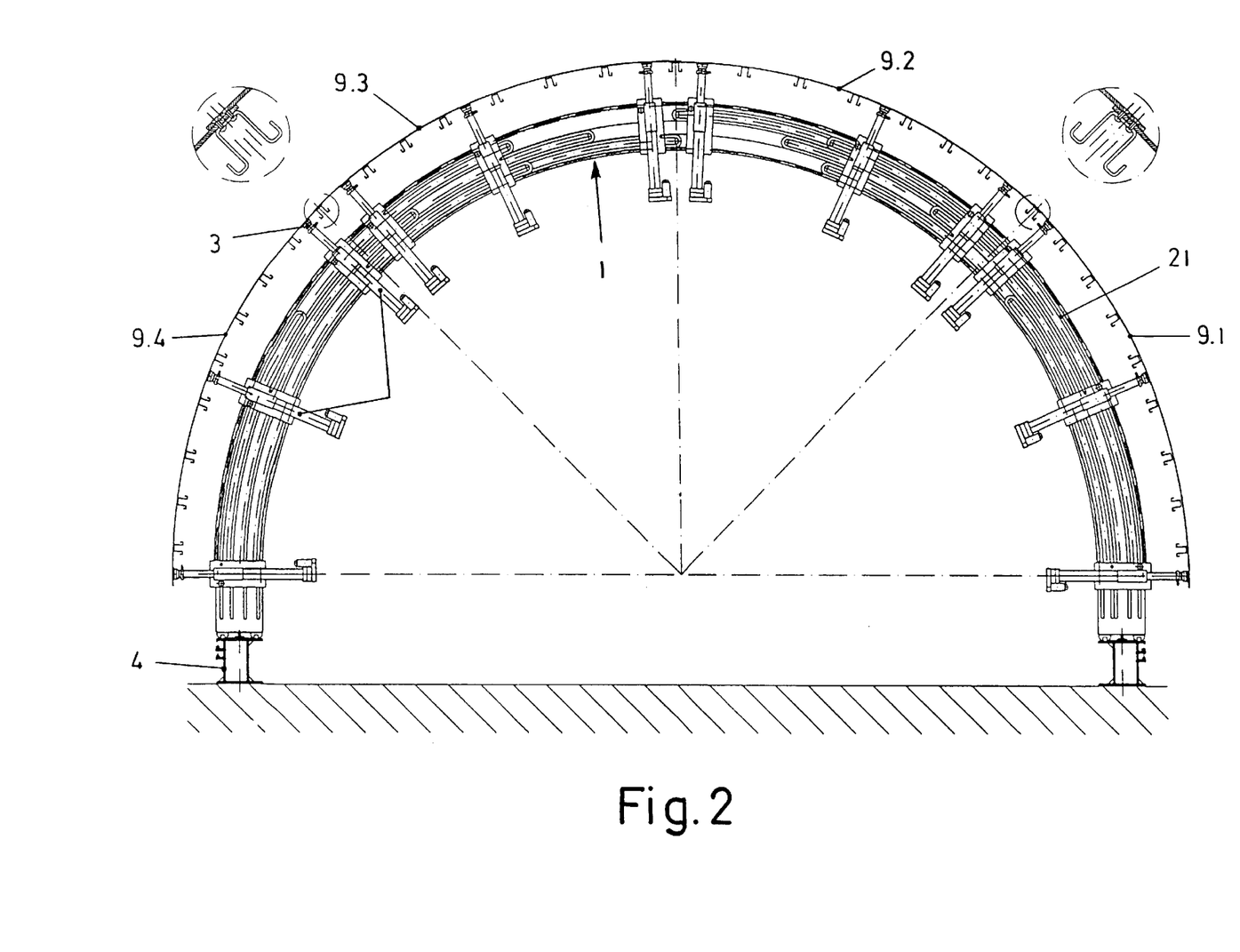
FIG. 2 is a front view of arc 1 which represents an example of the positioning of four panels 9.1, 9.2, 9.3 and 9.4, all of which together span an arc of approximately 180°.

FIG. 2 illustrates the positioning over each arc 1 of four panels 9.1, 9.2, 9.3 and 9.4 so that the four panels together span an arc that is approximately 180°.

Figure 3:
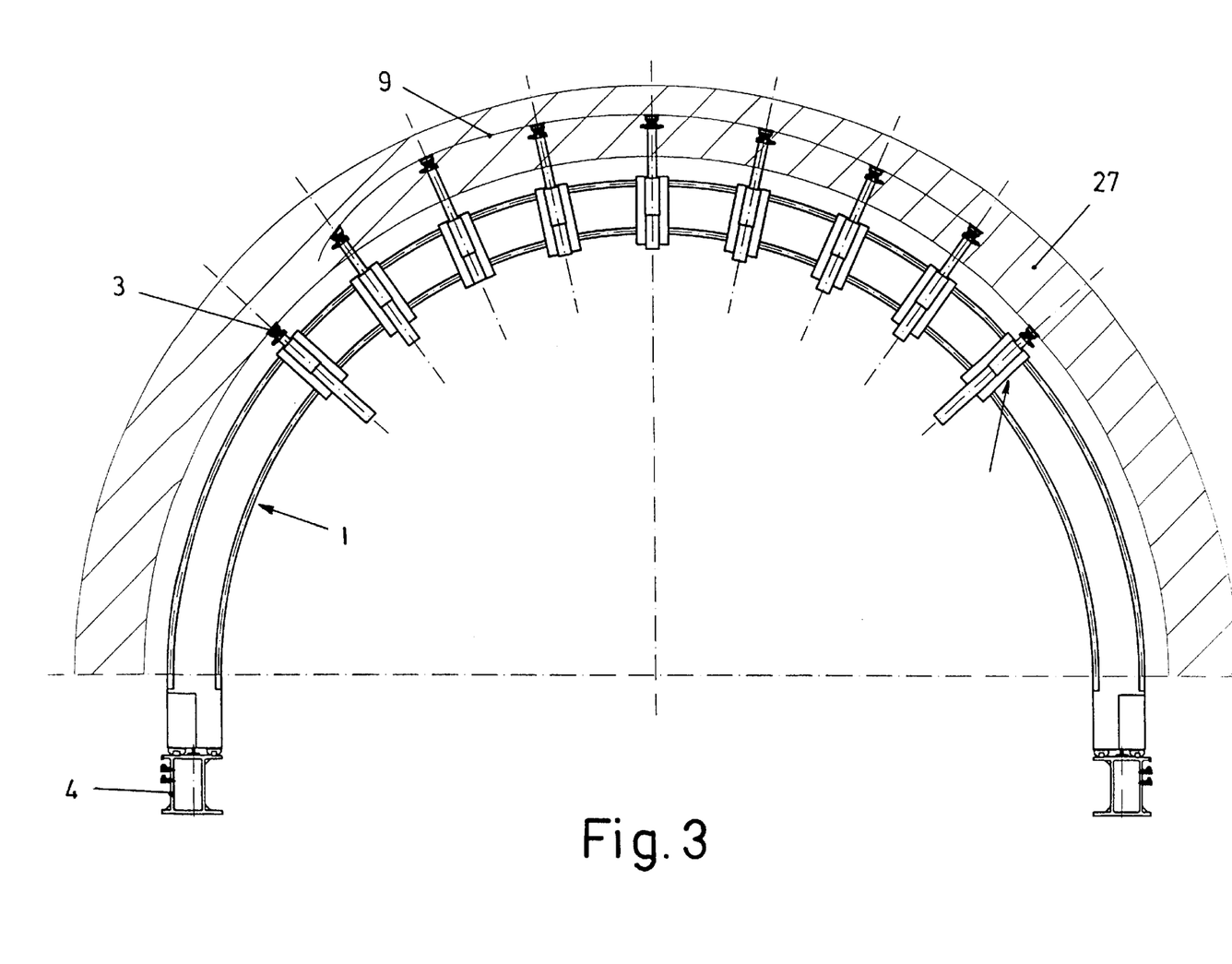
FIG. 3 is a front view of arc 1 representing an example of the positioning of one panel 9 with an irregular curve, within a preset working area 27.

Referring to FIG. 3, workheads 3 of telescoping support columns 2 can be positioned in a preset working area 27, indicated by stripes, for supporting an irregular panel 9.

Figure 4:
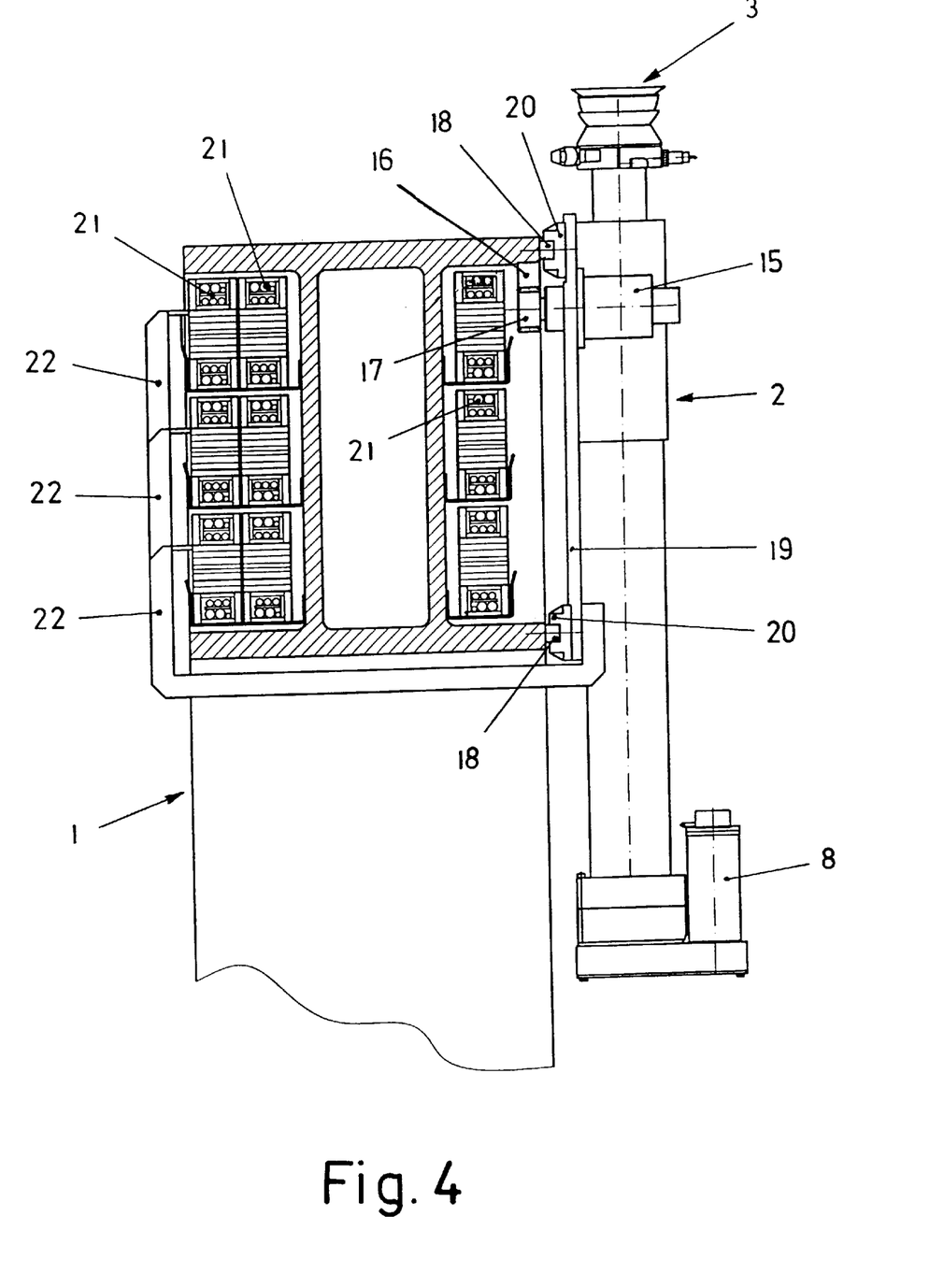
FIG. 4 is a cross section of arc 1 with flexible cable-conducting chains 21.

Referring to FIG. 4, each telescoping support column 2 includes a gearmotor 15 which rotates pinion 17 thereby engaging curved rack 16; and thereby drives the movement of telescoping support column 2 along the length of arc 1.

Also in FIG. 4, each telescoping support column 2 is placed on plate 19 which has slides 20 that fit into curved guides 18 of arc 1, which serve to guide and facilitate movement of the telescoping support columns 2 along the length of arc 1.

Flexible cable-conducting chains 21 operate with a connecting angle 22 between flexible cable-conducting chains 21 and telescoping support column 2.

Figure 5:
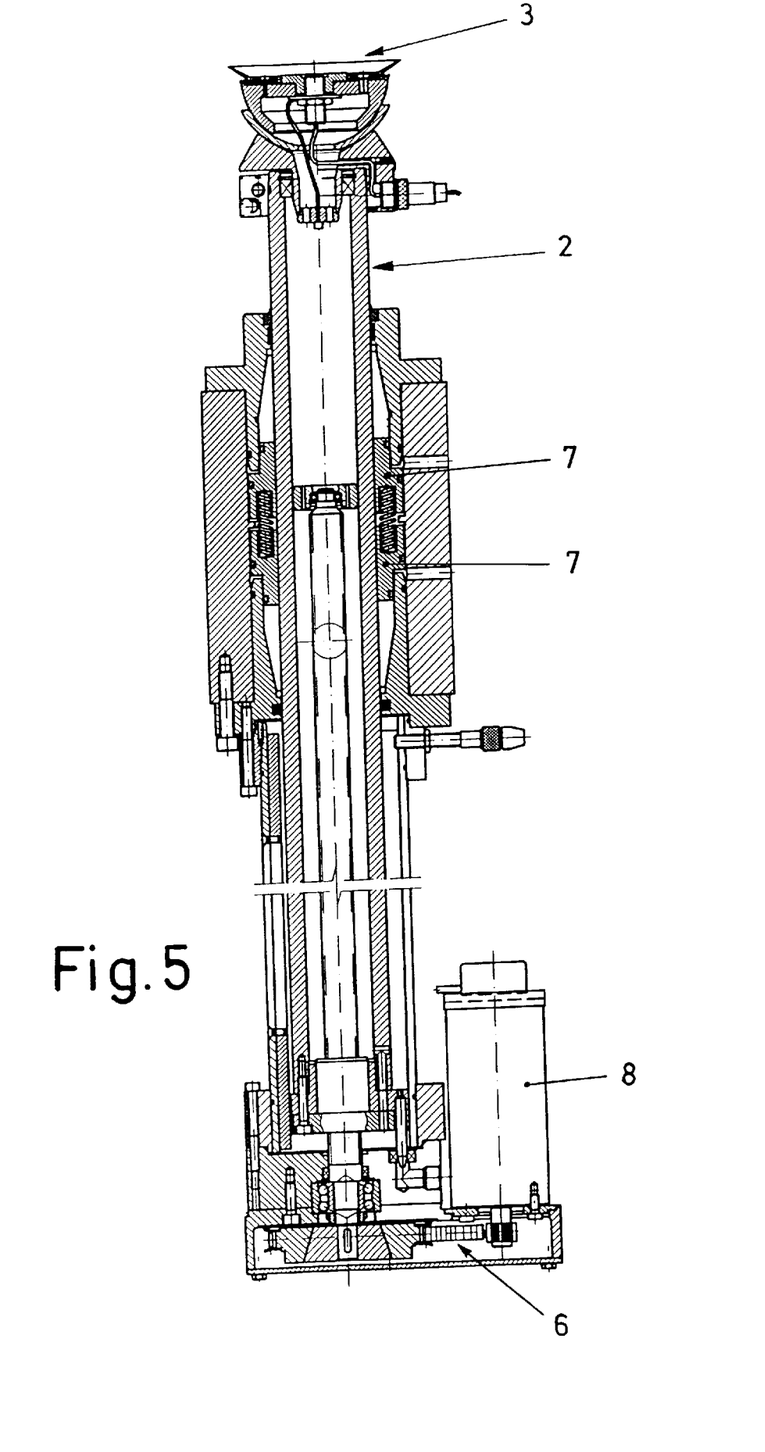
FIG. 5 is a cross section of a support column 2.

Referring to FIG. 5, each telescoping support column 2 has a motor 8 that by means of transmission 6 drives the motion of said telescoping support column 2;, as well as clips 7 that secure each telescoping support column 2 in the desired working position.

The movements of telescoping support columns 2 are controlled by a computer program in such a way that as soon as the specific data regarding the shape, size, and position of the panel 9 to be riveted are entered into the computer, the various telescoping support columns 2 will automatically move until their workheads 3 are in the correct position.

Figure 6:
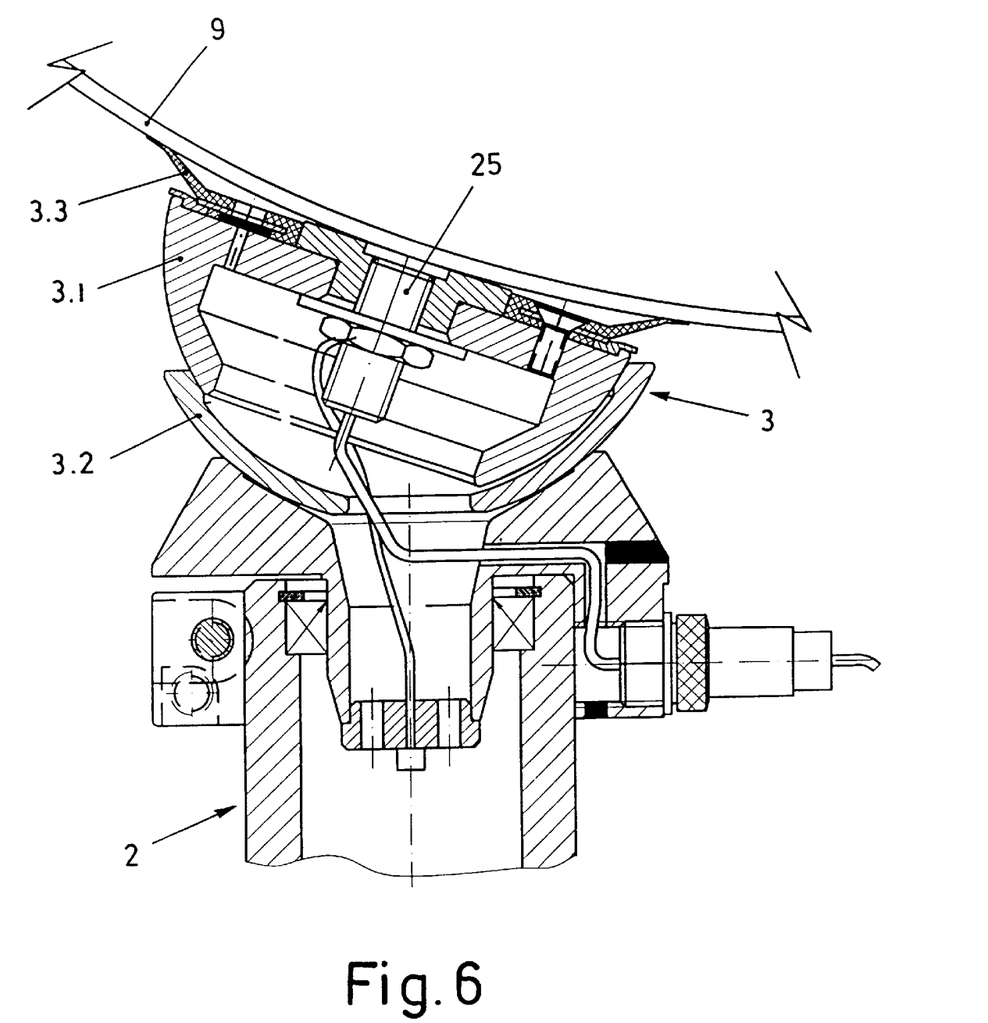
FIG. 6 is a cross section of the upper part of telescoping support column 2, indicating where the workheads 3 are located.
Figure 7:
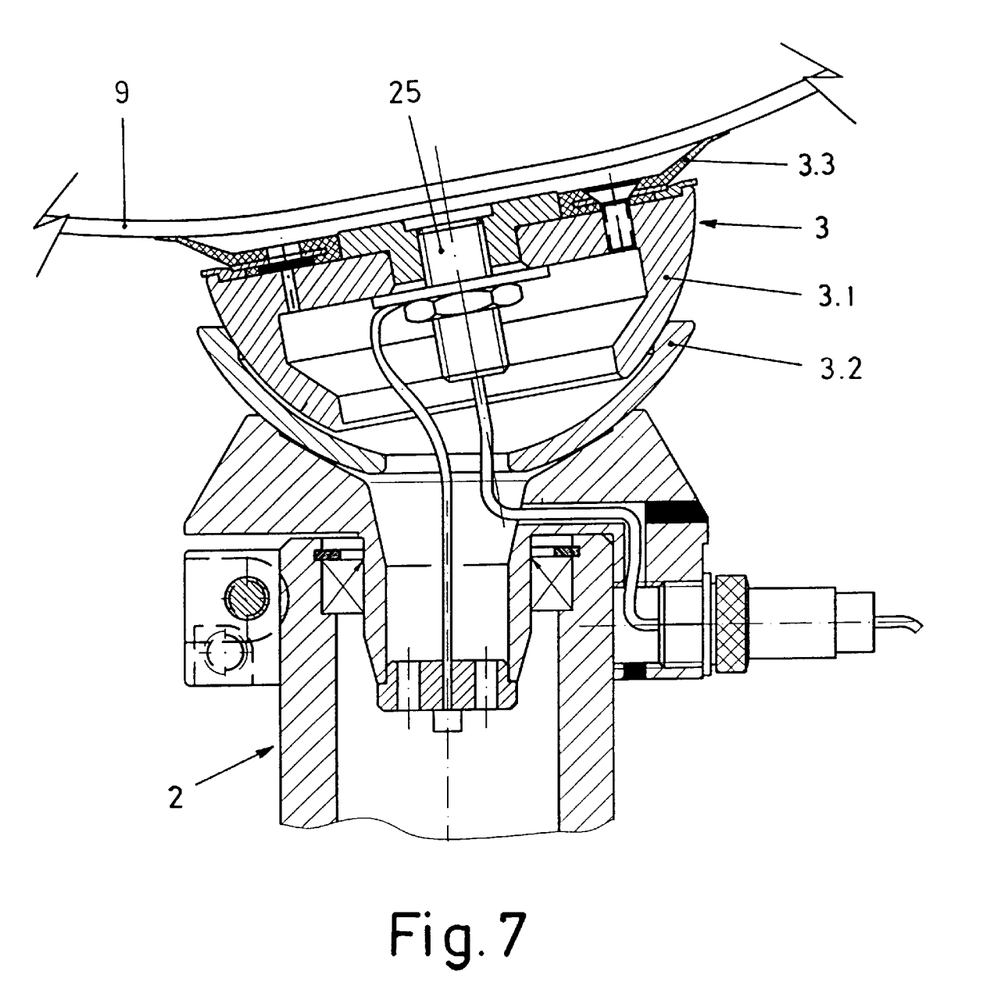
FIG. 7 is the same cross section as in FIG. 6, but without contact between panel 9 and the double hinge joint.

As shown in FIGS. 6 and 7, the workhead 3 of each telescoping support column 2 is made up of a double hinge joint 3.1 and 3.2 and a flexible cup 3.3 which is connected to an air system in such a way that when the corresponding panel 9 to be riveted is in its initial position, there is an outgoing flow of air that facilitates movement of the panel 9 until such time as it is positioned with respect to the flexible unit over reference holes that have been drilled into the panel 9; accordingly, panel 9 moves as if on a cushion of air, and, once it is in its correct working position, a vacuum is formed and flexible cups 3.3 act as air valves to secure said panel 9.

It should be noted that double hinge joint 3.1 and 3.2 permits each workhead 3 to move in a wide angle in order for flexible cup 3.3 to attain its desired position.

Each workhead 3 is equipped with a sensor 25 that is specially designed for nonferrous metals with a logical output proportional to distance.

Sensor 25 is installed in the center of a hemisphere of double hinge joint 3.1 and it serves to verify the quality and precision of the curved panel 9, so that when the panel 9 presses against a bearing plane the sensor measures the distance between the panel 9 and the bearing plane in such a way that if the component is in contact with the bearing plane, as represented in FIG. 6, sensor 25 gives a distance that is equal to the correct measurement. If the panel 9 is defective because its curvature is incorrect, thereby resulting in its pressing on other supporting elements such that the defective part of panel 9 is unable to press against the support of workhead 3, as shown in FIG. 7, sensor 25 will detect a distance that is greater than the correct one, an alarm will sound, and the defective areas on the curved panel 9 will appear on a screen of computer 24.

In addition to positioning and securing the panel 9 by the action of air valves that cause a depression in the interior of the telescoping support columns 2, workheads 3 and sensors 25 also act as quality control equipment, since it is very difficult to inspect large components with spherical curves by using procedures other than the one proposed. Accordingly they serve a double function and make the system more efficient.

FIGS. 8 and 9 are views in perspective of an application of the flexible unit machine for multiple and simultaneous riveting and other operations. As illustrated in FIG. 9, large fuselage panels are put in place on unit U.1 and are supported on rails 10 in such a way that as soon as all panels 9 are in position, unit U.1 moves into the interior of circular riveter 26 and remains in the position denoted by unit U.2.

When the corresponding modular flexible unit is in the position indicated by reference number U.2 in FIG. 9, and once it has been blocked into fixed position, circular riveter 26 goes into operation so that when the area to be riveted coincides with the position of workheads 3 of an arc 1 of this unit U.2, before collision occurs, all telescoping support columns 2 contract and assume their lowest position. At that time, the arc 1 in question moves to another position and workheads 3 are raised to their corresponding theoretical position. For example, if the panel 9 to be riveted is spherical in shape, the resultant movement of telescoping support columns 2 in the upwards "Z" direction will be different from the previous position, thereby permitting riveting to be performed in the area of the previous position thereby avoiding any collisions between the circular riveter 26 and workheads 3.

The position changes of arcs 1 and workheads 3 are performed by means of computer programs that coordinate the movements of the riveter 26, the arcs 1, telescoping support columns 2, and workheads 3.

Each unit U.1 to U.n is automatic and independent in its movements so that in its movement along the rails 10 until the end of the process, all movable elements remain stable and mechanically secured without any electrical or pneumatic power, and only in the predetermined work station will automatically driven plugs be connected and disconnected as required by the operation to be performed.

When the cycle of operations is completed in the position of a unit U.n, and once all panels 9 and stringers have been joined together, the vacuum in workheads 3 will be released, and the entire fuselage section can be removed and sent on to the next work station for the next operation.

When each flexible unit has been freed of panels 9 in the area of unit U.n, it can then be transported by means of a crane that hooks onto four hitch rings 12 located at the ends of rails 4, as shown in the detail in FIG. 8a, and carried back to the position of unit U.1 where the cycle can begin again. If the components to be riveted in the new cycle are different, the unit will reposition itself automatically to the configuration required by the new components, in the same unit U.1 position, by means of a program that corresponds to the dimensions of the new components.

Figure 10:
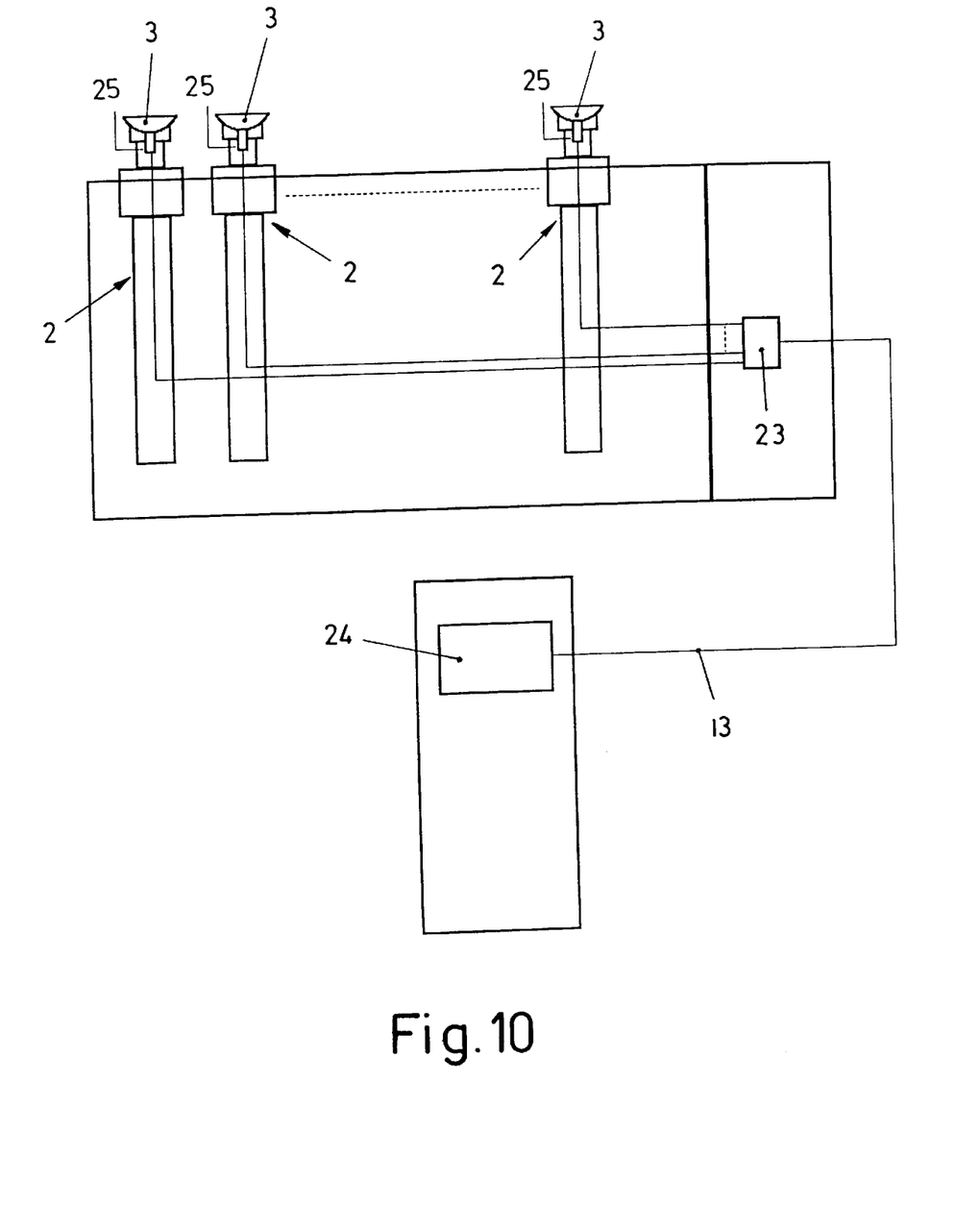
FIG. 10 is a diagram of the operation of sensor 25.

FIG. 10 illustrates a schematic diagram of the verification process components. Sensor 25 sends an analog signal as a function of the distance between point "zero" (the contact point between panel 9 and flexible cup 3.3) and point "one" (the difference between the contact point and the actual distance of the panel 9 at that time).

This analog signal is digitized by an analog/digital converter 23 and transmitted by the control network 13 (bit bus) to a computer 24.

I claim:

1. A Component support and mechanization machine, characterized by the fact that it comprises a set of units, each of which comprises a collection of arcs; each arc forms a continuous curved trajectory that supports a series of telescoping columns equipped with means to move along said arc; each of these telescoping columns has on its tree end a workhead, made up of a double hinge joint and a flexible cup, in the center of which is a capacitative sensor which serves to verify the quality and precision of a component to be supported by the machine; meanwhile, the arcs of each unit are mounted on first rails and may be moved along said first rails, and the different units are placed on as many main rails.

2. The component support and mechanization machine according to claim 1, characterized by the fact that the capacitative sensor on each workhead supplies an analog signal as a function of the distance between the contact area of the component and the flexible cup and the actual distance of the component at that time; said analog signal is digitized by a converter card and transmitted by a control network to a corresponding computer.

3. The component support and mechanization machine, according to claim 1, characterized by the fact that according to a practical application, the means to move each telescoping column along its arc, comprise a first gearmotor which is connected to the telescoping column and equipped with a pinion that engages a curved rack on the arc; said first gearmotor is mounted on a support plate on the telescoping column, and this support plate includes slides that fit into curved guides on the arc.

4. The component support and mechanization machine, according to claim 1, characterized by the fact that the arcs are equipped with further gearmotors that permit their movement along said first rails; these movements, as well as the movements of the telescoping columns and a corresponding mechanization device, are controlled and coordinated by a computer program.

5. The component support and mechanization machine, according to claim 1, characterized by the fact that each unit has on each end two arcs that connect it to the first rails; these arcs are fixed and do not carry telescoping columns.

6. The component support and mechanization machine, according to claim 1, characterized by the fact that each unit is autonomous, with its own means of motion, with the movable parts of each unit remaining stable and mechanically blocked, without electrical or pneumatic connection in their movement on the main rails; although when they are in their fixed working positions, and if it is required they will receive electrical connection through automatically driven quick-action plugs.

* * * * *

UNITED STATES PATENT AND TRADEMARK OFFICE
CERTIFICATE OF CORRECTION

PATENT NO.     : 6,121,781
DATED          : September 19, 2000
INVENTOR(S)    : Martinez It is certified that error appears in the above-identified patent and that said Letters Patent is hereby corrected as shown below:

Claim 1, line 6, change " tree " to -- free --

Signed and Sealed this

Seventeenth Day of April, 2001

Attest:

NICHOLAS P. GODICI

Attesting Officer   Acting Director of the United States Patent and Trademark Office